US 8,992,196 B2

(12) United States Patent
Ikeda et al.

(10) Patent No.: US 8,992,196 B2
(45) Date of Patent: Mar. 31, 2015

(54) SEAMLESS CAPSULE MANUFACTURING APPARATUS

(75) Inventors: Masayuki Ikeda, Tokyo (JP); Hiroshi Nagao, Tokyo (JP)

(73) Assignee: Freund Corporation, Tokyo (JP)

( * ) Notice: Subject to any disclaimer, the term of this patent is extended or adjusted under 35 U.S.C. 154(b) by 605 days.

(21) Appl. No.: 13/129,875

(22) PCT Filed: Oct. 9, 2009

(86) PCT No.: PCT/JP2009/067615
§ 371 (c)(1),
(2), (4) Date: May 18, 2011

(87) PCT Pub. No.: WO2010/058661
PCT Pub. Date: May 27, 2010

(65) Prior Publication Data
US 2011/0220015 A1    Sep. 15, 2011

(30) Foreign Application Priority Data

Nov. 20, 2008    (JP) ................................. 2008-297288

(51) Int. Cl.
*A23P 1/04*    (2006.01)
*B29B 9/00*    (2006.01)
*A61J 3/07*    (2006.01)

(52) U.S. Cl.
CPC ..... *A23P 1/04* (2013.01); *A61J 3/07* (2013.01)
USPC ...... 425/5; 425/6; 425/7; 425/10; 425/382 R; 425/463; 425/130; 425/133.1; 264/4; 264/9

(58) Field of Classification Search
USPC ............. 425/5–10, 67, 377, 382 R, 462–464, 425/130, 131.1, 133.1; 264/4, 7, 9–10
See application file for complete search history.

(56) References Cited

U.S. PATENT DOCUMENTS

| | | | | |
|---|---|---|---|---|
| 2,428,911 A | * | 10/1947 | Gunnell | 425/5 |
| 3,464,926 A | * | 9/1969 | Meier et al. | 425/5 |
| 4,302,166 A | * | 11/1981 | Fulwyler et al. | 425/6 |
| 5,372,679 A | | 12/1994 | Costa et al. | |

(Continued)

FOREIGN PATENT DOCUMENTS

| | | |
|---|---|---|
| JP | 57-193839 | 11/1982 |
| JP | 58-22062 | 2/1983 |

(Continued)

OTHER PUBLICATIONS

International Preliminary Report on Patentability issued Jun. 30, 2011 in International (PCT) Application No. PCT/JP2009/067615.

(Continued)

*Primary Examiner* — Joseph S. Del Sole
*Assistant Examiner* — Thukhanh T Nguyen
(74) *Attorney, Agent, or Firm* — Wenderoth, Lind & Ponack, L.L.P.

(57) ABSTRACT

A seamless capsule manufacturing apparatus (1) manufactures a seamless capsule by means of nozzles (2a-2d). A core liquid (5) and a coating liquid (6) are supplied to each of the nozzles (2a-2d) from pumps (16, 18) through distributors (21, 22). The distributors (21, 22) and the nozzles (2a-2d) are connected to each other by core liquid distributing tubes (23a-23d) and coating liquid distributing tubes (25a-25d), and each of the core liquid distributing tubes (23a-23d) and each of the coating liquid distributing tubes (25a-25d) have the same length. A vibrator (24) is mounted to the distributor (21), and the core liquid (5) is supplied to the nozzles (2a-2d) while being vibrated. Each of the distributors (21, 22) is provided with an air vent device (35), and air vent is performed appropriately.

17 Claims, 7 Drawing Sheets

(56) References Cited

U.S. PATENT DOCUMENTS

| | | |
|---|---|---|
| 6,616,435 B2 * | 9/2003 | Lee et al. .................. 425/83.1 |
| 7,780,883 B2 * | 8/2010 | Amagasa et al. ............... 425/8 |
| 8,196,778 B2 * | 6/2012 | Saidman ..................... 425/72.1 |
| 2003/0106294 A1 * | 6/2003 | Chung et al. ................. 55/486 |

FOREIGN PATENT DOCUMENTS

| | | |
|---|---|---|
| JP | 60-212166 | 10/1985 |
| JP | 61-149156 | 7/1986 |
| JP | 6-166979 | 6/1994 |
| JP | 2005-296845 | 10/2005 |
| JP | 2006-288215 | 10/2006 |

OTHER PUBLICATIONS

International Search Report issued Jan. 19, 2010 in International (PCT) Application No. PCT/JP2009/067615.

* cited by examiner

SEAMLESS CAPSULE MANUFACTURING APPARATUS

TECHNICAL FIELD

The present invention relates to a manufacturing apparatus for mass production of seamless capsules, in which a filling substance, such as food, health food, medicine or aroma chemical, is covered with a coating containing gelatin, agar or the like.

BACKGROUND ART

Many seamless capsules used for medicine or the like have been produced by a production method called a dripping method. According to the dripping method, a multi-nozzle is used. For a two-layer capsule, what is used is a double nozzle; a discharge opening for a capsule core liquid is placed inside the double nozzle, while a discharge opening for a coating liquid is placed outside the double nozzle. The core liquid and the coating liquid are released from a tip of each nozzle into a hardening liquid. The released droplet takes a spherical shape because of the surface tension thereof. The droplet is cooled down and solidified in the hardening liquid that circulates at a constant speed. As a result, a spherical seamless capsule is formed.

What is disclosed in Patent Document 1, is a device for manufacturing seamless capsules as described above. According to the device disclosed in Patent Document 1,, the coating liquid and the core liquid are each supplied by separate pumps to a multi-nozzle before being discharged into the hardening liquid. However, since there is one multi-nozzle in the device, the capsule production is proportional to how long the device operates. Accordingly, in the case of the device disclosed in Patent Document 1,, an increase in the operation time or in the number of the devices is required to raise production. For mass production of seamless capsules, a device having a plurality of multi-nozzles, as disclosed in Patent Document 2, has been proposed. According to the device disclosed in Patent Document 2,, what is used is a chamber to which a plurality of nozzles is connected. The chamber includes a chamber for supplying a coating liquid and a chamber for a core liquid. The coating liquid and the core liquid are each supplied to each chamber by separate pumps. The coating liquid and the core liquid are supplied from both the cambers to each nozzle. Droplets of both liquids are discharged from each nozzle to a hardening liquid, and seamless capsules are mass-produced.

Patent Document 1:, Jpn. Pat. Appln. Laid-Open Publication No. 2006-288215

Patent Document 2:, Jpn. Pat. Appln. Laid-Open Publication No. 58-22062

Patent Document 3:, Jpn. Pat. Appln. Laid-Open Publication No. 61-149156

Patent Document 4:, Jpn. Pat. Appln. Laid-Open Publication No. 6-166979

DISCLOSURE OF THE INVENTION

Problems to be Solved by the Invention

However, according to the device disclosed in Patent Document 2,, while seamless capsules can be mass-produced with one device, the particle diameter of the produced seamless capsules varies. Therefore, the problem is that the production is extremely inefficient. That is, first, the device disclosed in Patent Document 2, has a structure in which a nozzle is consecutively provided so as to be connected to the inside of the chamber, with a liquid being supplied in one direction from a side of the chamber. Depending on a difference in the distance from a liquid supply opening, the particle diameter of the capsules varies among the nozzles. In general, large amounts of liquids flow on a portion where resistance is small, while small amounts of liquids flow on a portion where resistance is large due to the nature of the liquids. In the case of the structure of the device disclosed in Patent Document 2,, large amounts of liquids tend to flow in a nozzle close to the liquid supply opening, and smaller amounts of liquids tend to flow in a remote nozzle. As a result, the particle diameter of seamless capsules produced from a nozzle close to the liquid supply opening is large, while the particle diameter of seamless capsules produced from a nozzle far away from the liquid supply opening is small.

Secondly, there is no vibrator in the device disclosed in Patent Document 2. The control of the particle diameter depends on the control of flow volumes from pumps. Therefore, another problem is that pulsation of pumps or the like leads to variations even in the particle diameter of capsules produced from one multi-nozzle. That is, according to the device disclosed in Patent Document 2,, the particle diameter varies among the nozzles. Moreover, even with a single nozzle, the particle diameter varies. One feature of the seamless capsules is that the particle diameter of the capsules obtained is constant and the yield rate is excellent. Therefore, if differences in the particle diameter of the capsules emerge across all the nozzles, the particle-size distribution spreads widely, resulting in a decrease in the yield rate and huge losses.

Furthermore, the device of Patent Document 2, is of a closed-loop type, with a sealed path for supplying a coating liquid or the like. Accordingly, the air that each liquid contains accumulates in the chamber over time. As the air builds up in the chamber, the liquid level in the chamber drops due to the accumulated air. If the liquid level drops and goes below a liquid introduction opening of each nozzle, it becomes impossible to supply the coating liquid or the like to the nozzles as well as to produce capsules. Therefore, for the device disclosed in Patent Document 2,, an operation of disassembling the chambers and the like is required to remove the air, and productivity drops accordingly.

Incidentally, even in the case of the device of Patent Document 1,, the accumulated air can be a cause of variations in the particle diameter and a decrease in productivity. That is, since there is no mechanism for removing air even in the device of Patent Document 1,, air accumulates below a vibratory film, which is placed on a head-top portion of a nozzle, after a certain period of time has passed. The nature of the accumulated air is to absorb vibrations of a vibrator. Therefore, as the accumulated air grows, the state of vibration becomes unstable, possibly causing the particle diameter to vary. Therefore, in the case of the device disclosed in Patent Document 1,, a manual operation of removing air sometimes takes place, i.e. removing the vibrator to upend the nozzles and thereby pushing the air out of the nozzles. After the air-removing operation, the vibrator is set again before the production of capsules restarts. However, such an air-removing operation is performed manually. Therefore, the operation takes a lot of time and effort; there is a risk that a nozzle could fall. Moreover, during the air-removing and resetting operation, the production of seamless capsules needs to be suspended, which is a cause of a drop in productivity.

The object of the present invention is to provide a seamless capsule manufacturing apparatus by which seamless capsules of equal particle diameter can be mass-produced in a stable manner.

Means for Solving the Problems

A seamless capsule manufacturing apparatus of the present invention is a capsule manufacturing apparatus that supplies a capsule forming liquid to a plurality of nozzles using a pump and releases droplets from the nozzles into a capsule forming pipe in which a hardening liquid flows to manufacture seamless capsules, characterized by including: a plurality of tubes connected to each of the nozzles; and a distributor that is connected to the tubes so that the capsule forming liquid supplied from the pump is poured in and distributes and supplies the capsule forming liquid to each of the nozzles through the tubes.

According to the present invention, the distributor exists between the pump and the nozzles. The distributor distributes and supplies the capsule forming liquid to each nozzle. Therefore, it is possible to supply the capsule forming liquid in equal amounts to a plurality of nozzles from one pump. The capsule forming liquid supplied to each nozzle is substantially the same in flow velocity and flow volume; the differences in flow volume between the nozzles become small. Accordingly, the differences of the particle diameter of the capsules formed by each nozzle become small.

In the seamless capsule manufacturing apparatus, a liquid pool portion in which the capsule forming liquid is stored may be provided in the distributor. As a result, in the distributor, a portion having a buffer function is formed, enabling the capsule forming liquid to be supplied to the tubes in a stable manner. Moreover, the tubes may be so set as to be the same in length. As a result, it is possible to supply the liquid in equal amounts to the nozzles and reduce the differences in flow volume between the nozzles.

Furthermore, in the distributor, an air vent device that drives accumulated air out of the distributor may be provided. As a result, it is possible to easily remove the air from the distributor without stopping the device for a long time. In this case, it is preferred that the air vent device be placed on a head-top portion of the distributor, where air is likely to accumulate. Moreover, a plurality of tube holes may be provided on the distributor, and the tubes may be connected to the tube holes; the tube holes may be each placed at the same distance from an air-removing hole to which the air vent device is attached.

Moreover, an air pool may be provided above the liquid pool portion of the distributor. The air pool absorbs pulsation of the capsule forming liquid. In this case, the tubes may be inserted into the distributor; tip portions of the tubes may be submerged in the capsule forming liquid stored in the liquid pool portion.

Meanwhile, in the distributor, a vibrator that vibrates the capsule forming liquid may be also provided. In this case, the vibrator may be connected to the distributor via a flexible vibratory film attached to the distributor. Moreover, a plurality of tube holes may be provided on the distributor, and the tubes may be connected to the tube holes; the vibratory film may be placed at the same distance from each of the tube holes. As a result, the vibrations are evenly applied to the tubes, reducing the differences of the particle diameter of the capsules formed by each nozzle.

Furthermore, the tubes may be connected directly to nozzle tips, which are attached to tips of the nozzles and discharge the capsule forming liquid into the capsule forming pipe. As a result, the distributor and the nozzle tips are connected together without a change in inside diameter, and it is possible to prevent the building up of air bubbles caused by decreases in liquid velocity. Therefore, it is possible to prevent uneven vibrations caused by air bubbles, as well as to reduce variations in capsule particle diameter.

Advantages of the Invention

According to the seamless capsule manufacturing apparatus of the present invention, in the capsule manufacturing apparatus that manufactures seamless capsules using a plurality of nozzles, the distributor in which capsule forming liquid supplied from the pump is poured is provided so that the capsule forming liquid is distributed and supplied to each nozzle. Therefore, it is possible to supply the capsule forming liquid in equal amounts to a plurality of the nozzles from one pump, and it is possible to keep the differences in flow volume between the nozzles small. As a result, it is possible to curb variations in capsule particle diameter between the nozzles and produce seamless capsules of equal particle diameter in large numbers in a stable manner.

EXPLANATION OF REFERENCE SYMBOLS

1: Seamless capsule manufacturing apparatus
2: Nozzle
2a, to 2d:, Nozzle
3: Capsule forming pipe
3a, to 3d:, Capsule forming pipe
4: Droplet
5: Core liquid
6: Coating liquid
7: Cooling liquid
8: Cooling liquid supply tank
9: Cooling liquid supply pipe
11: Cooling tank
12: Pump
13: Overflow tank
14: Return pipe
15: Core liquid tank
16: Pump
17: Core liquid tank
18: Pump
21: Core liquid distributor
22: Coating liquid distributor
23: Core liquid distributing tube 23a, to 23d:, Core liquid distributing tube
24: Vibrator
25: Coating liquid distributing tube
25a, to 25d:, Coating liquid distributing tube
26: Nozzle tip
27: Core liquid nozzle base
28: Coating liquid nozzle base
28a:, Coating liquid inflow opening
29: Fixture
30: Nozzle cap
30a:, Coating liquid discharge opening
31: Upper part
32: Tube part
33: Lower part
34: Upper flange
34a:, Convex portion
34b:, Flat plate portion
35: Air vent device
36: Cavity portion
37: Air-removing hole
38: Bolt hole
39: Tube hole
39a, to 39d:, Tube hole
40: Air discharge opening
41: Extending portion
42: Device main unit
43: Flow passage
44: On-off valve
45: Cock
46: Gasket
47: Core liquid supply hole
48: Tube attachment portion
48a:, Core liquid supply opening
49: Core liquid supply tube
50: Liquid pool portion
51: Base plate
52: Vibratory film
53: Presser plate
54: Tap hole
55: Threaded bolt
56: Gasket
57: Bolt hole
58: Membrane fixing bolt
59: Pin
61: Flange portion
62: Female screw portion
63: Pin hole
64: Set plate
65: Male screw portion
66: Vibrator attachment base
67: Pin fixing portion
68: Distributor attachment base
71: Supporting bolt
72: Attachment hole
73: Supporting nut
74: Base plate fixing nut
81: Tube part
82: Lower part
83: Coating liquid supply portion
84: Tube attachment portion
84a:, Coating liquid supply opening
85: Core liquid supply tube
91: Coating liquid distributor
92: Liquid pool portion
101: Core liquid distributor
102: Tube part
103: Vibratory film
104: Vibrator
105a, to 105d:, Tube hole
106: Coating liquid supply portion

BEST MODE FOR CARRYING OUT THE INVENTION

Hereinafter, examples of the present invention will be described in detail based on the accompanying drawings.

EXAMPLE 1

Figure 1:
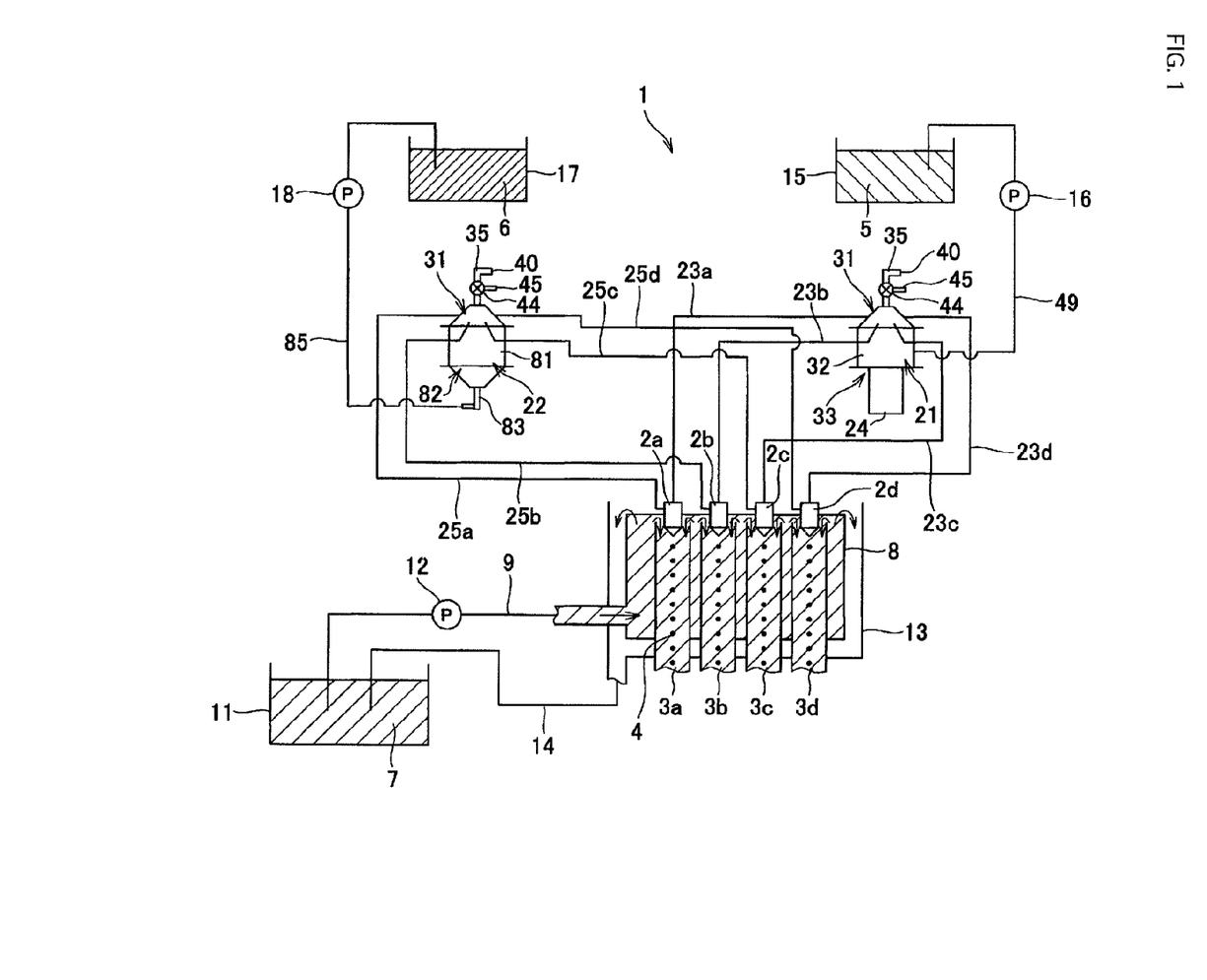
FIG. 1 is an explanatory diagram showing the overall configuration of a seamless capsule manufacturing apparatus according to example 1, of the present invention.

FIG. 1 is an explanatory diagram showing the overall configuration of a seamless capsule manufacturing apparatus according to example 1, of the present invention. A seamless capsule manufacturing apparatus 1 (abbreviated as a manufacturing apparatus 1 hereinafter when necessary) of the present invention is an apparatus of a submerged nozzle type that is equipped with multiple-structure nozzles 2 as in the case of Patent Document 1, or 2. The manufacturing apparatus 1 releases droplets 4 into capsule forming pipes 3 from the nozzles 2, thereby producing seamless capsules.

In the manufacturing apparatus 1, a plurality of nozzles 2 (four in this case: nozzles 2a, to 2d) is provided. To each of the nozzles 2a, to 2d,, a core liquid 5 and a coating liquid 6 are supplied as liquids for forming capsules. Tip portions of the nozzles 2a, to 2d, are inserted into the capsule forming pipes 3a, to 3d. From each of the nozzles 2a, to 2d, two-layer droplets 4 made up of the core liquid 5 and the coating liquid 6 are discharged. The droplets 4 are cooled and solidified by cooling liquid 7 in the capsule forming pipes 3a to 3d,, and two-layer spherical seamless capsules are formed.

The capsule forming pipes 3a, to 3d, of the manufacturing apparatus 1 are placed in a cooling liquid supply tank 8. The cooling liquid (hardening liquid) 7 is supplied to the capsule forming pipes 3a, to 3d, from the cooling liquid supply tank 8. To the cooling liquid supply tank 8, a cooling liquid supply pipe 9 is connected. The cooling liquid 7 in a cooling tank 11 is supplied by a pump 12 into the cooling liquid supply tank 8 via the cooling liquid supply pipe 9. An overflow tank 13 is provided outside the cooling liquid supply tank 8. The cooling liquid 7 in the cooling liquid supply tank 8 flows into the capsule forming pipes 3a, to 3d,, while the surplus cooling liquid is discharged from the overflow tank 13. The cooling liquid 7 that has flowed into the overflow tank 13 returns to the cooling tank 11 via a return pipe 14.

In this case, in the manufacturing apparatus 1, the core liquid 5 and the coating liquid 6 are each distributed and supplied by distributors 21 and 22 to each of the nozzles 2a, to 2d. The core liquid 5 is stored in a core liquid tank 15. First, the core liquid 5 is supplied by a pump 16 to the core liquid distributor 21 from the core liquid tank 15. Then, the core liquid 5 is distributed to each of the nozzles 2a, to 2d via core liquid distributing tubes 23 (23a, to 23d) from the distributor 21. The distributor 21 contains a vibrator 24. The core liquid 5 is vibrated when being supplied to the nozzles 2a, to 2d. The coating liquid 6 is stored in a coating liquid tank 17. First, the coating liquid 6 is supplied by a pump 18 to the coating liquid distributor 22 from the coating liquid tank 17. Then, as in the case of the core liquid 5, the coating liquid 6 is distributed to each of the nozzles 2a, to 2d, from the distributor 22 via coating liquid distributing tubes 25 (25a, to 25d).

Figure 2:
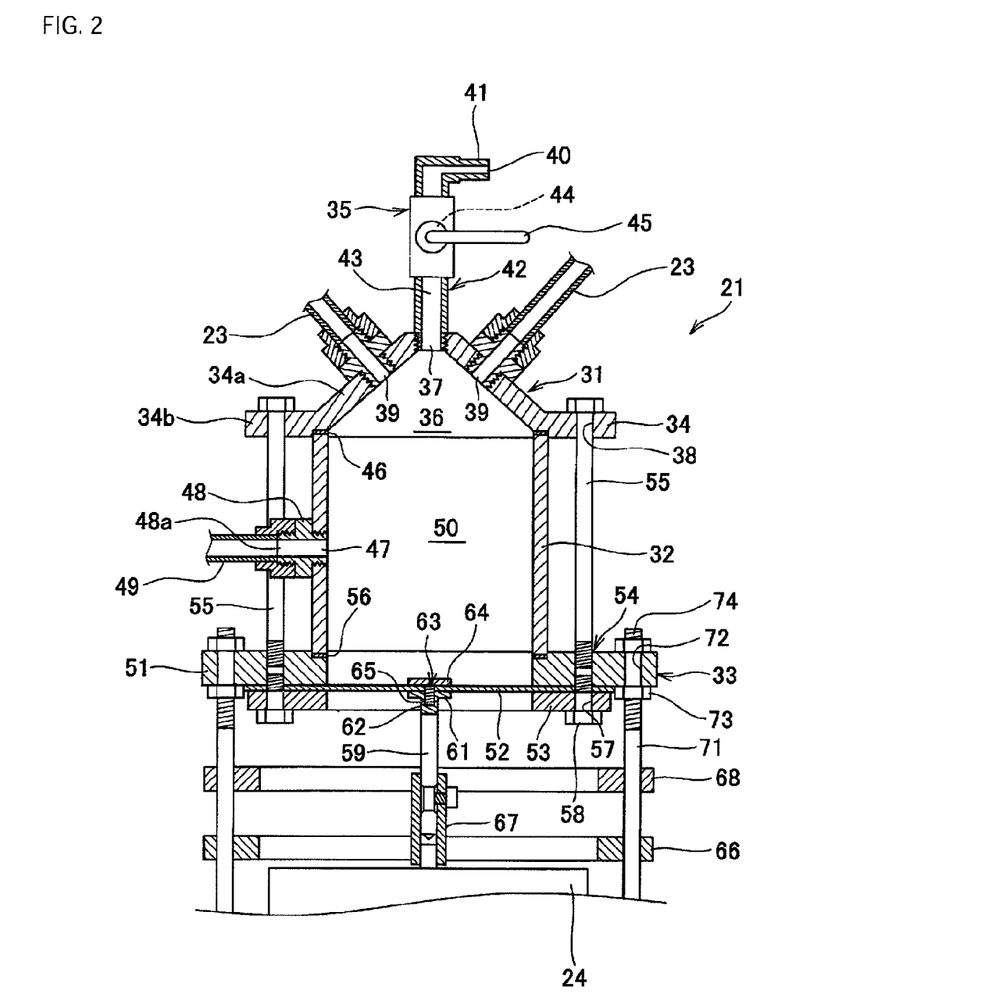
FIG. 2 is a cross-sectional view showing the configuration of a core liquid distributor.
Figure 3:
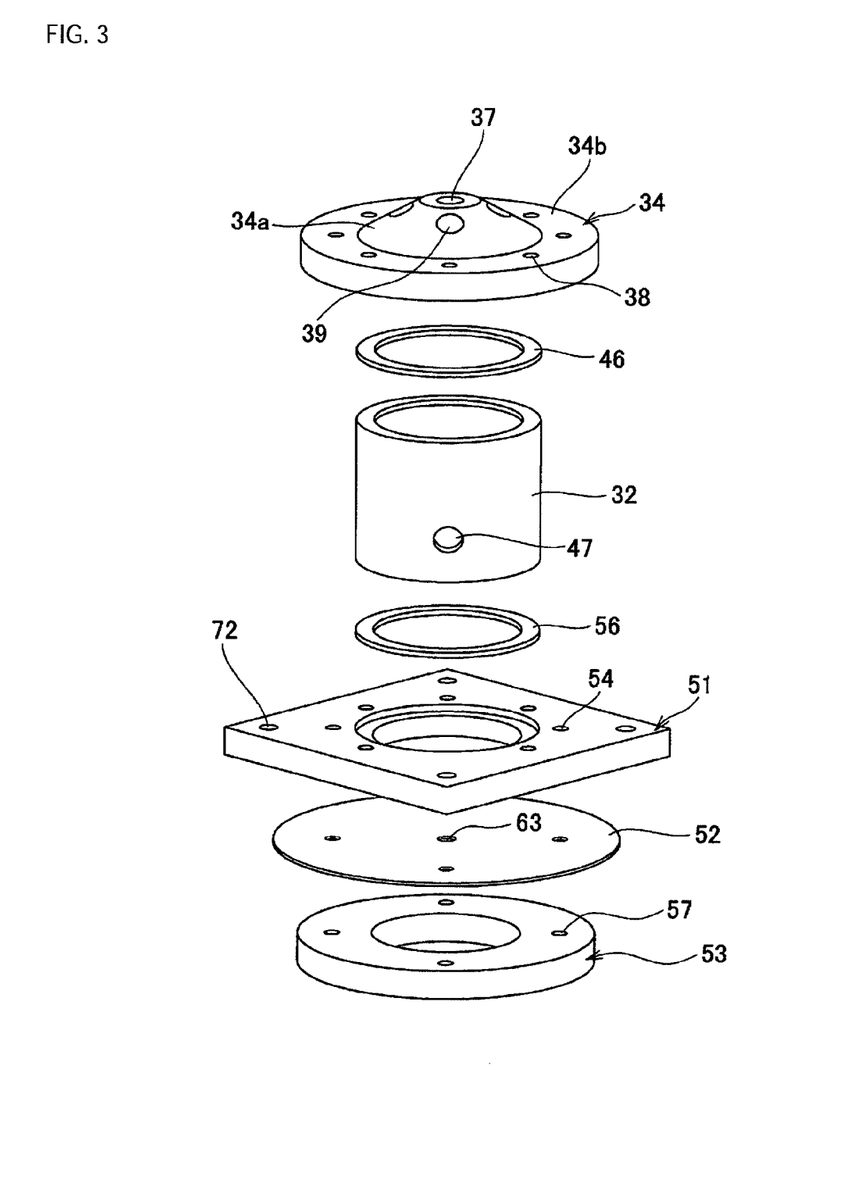
FIG. 3 is an exploded perspective view of essential portions of the core liquid distributor.

The structure of the distributor 21 is largely the same as that of the distributor 22. In this case, first, the distributor 21 will be described. FIG. 2 is a cross-sectional view showing the configuration of the core liquid distributor 21. FIG. 3 is an exploded perspective view of essential portions thereof. As shown in FIGS. 2 and 3, the distributor 21 can be divided into the following main components: an upper part 31, a tube part 32 and a lower part 33. The distributors 21 and 22 are basically made of stainless steel unless otherwise stated.

On the upper part 31, an upper flange 34 and an air vent device 35, both made of stainless steel, are provided. The upper flange 34 is formed in the shape of a circular disc. At the center of the upper flange 34, a convex portion 34a, is so provided as to project and have a tapered, inclined plane. On an outer circumference side of the convex portion 34a,, a ring-shaped flat plate portion 34b, is formed. On the flat plate portion 34b,, a plurality of bolt holes 38 (eight in this case) is made so as to be spaced out evenly and pierce therethrough. Inside the convex portion 34a,, there is a cavity portion 36 having a tapered ceiling plane. At a central top portion of the convex portion 34a,, an air-removing hole 37 is formed so as to pierce therethrough. On the inclined plane of the convex portion 34a,, four tube holes 39 (39a, to 39d) are formed so as to be spaced out evenly, pierce therethrough and surround the air-removing hole 37. The tube holes 39a, to 39d are each arranged so as to make equal angles with the air-removing hole 37 and be at the same distance from the air-removing hole 37.

Incidentally, it is also possible to have the tube holes 39a, to 39d, on the tube part 32 or the like. However, such a structure allows liquids to easily accumulate in a portion higher than the tube holes 39a, to 39d. In the case of the distributor 22, gelatin, which is frequently used as a coating liquid 6, could lead to the accumulation of the liquid; a long period of high temperatures could result in a decrease in gelatification performance. Therefore, in the seamless capsule manufacturing apparatus, it is desirable to have a structure that keeps the accumulated liquid as small as possible. Therefore, in the manufacturing apparatus 1, for both the distributors 21 and 22, the tube holes 39a, to 39d, are disposed on the upper part 31, keeping the core liquid 5 or coating liquid 6 from being accumulated. The structure is preferred even in terms of standardization of the structures of the distributors 21 and 22.

Figure 4:
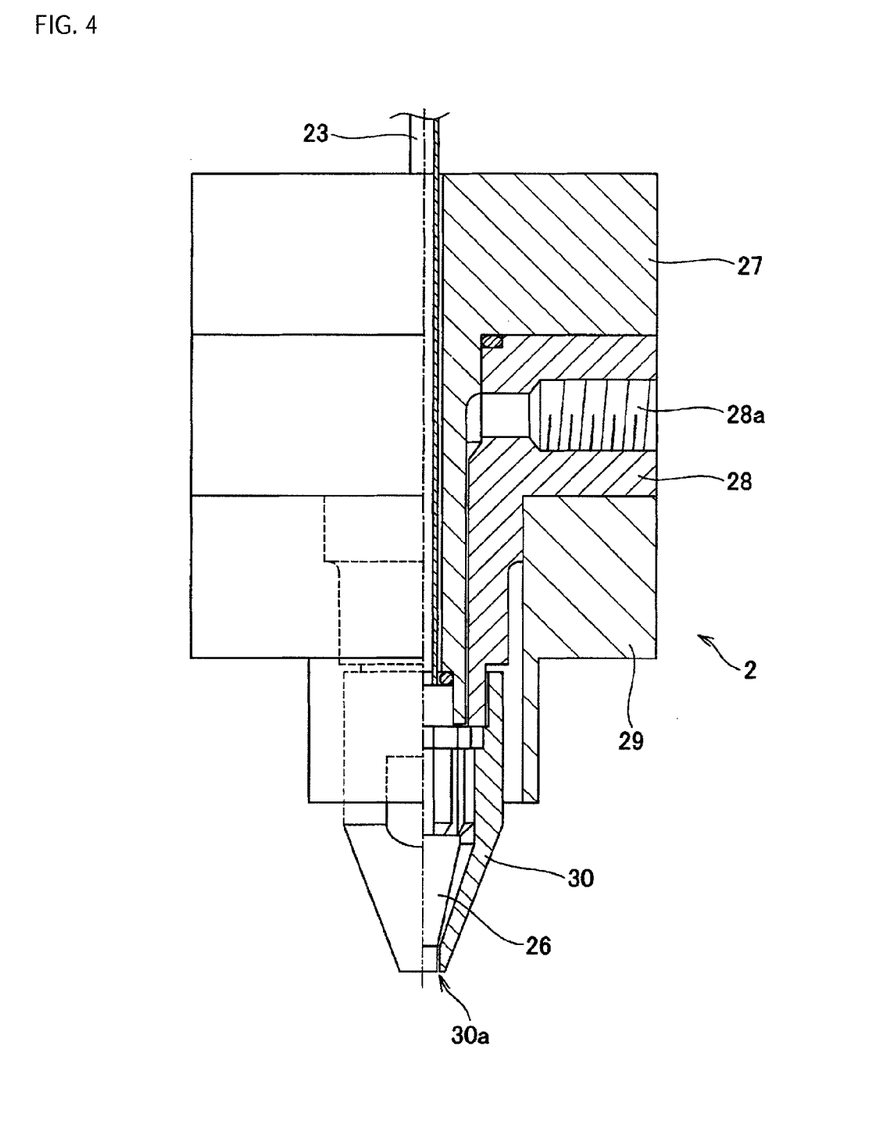
FIG. 4 is an explanatory diagram showing the configuration of a nozzle.

To the tube holes 39a, to 39d,, the core liquid distributing tubes 23a, to 23d, are connected. The core liquid distributing tubes 23a, to 23d, are set so as to be the same in length. The core liquid distributing tubes 23a, to 23d, are connected to the nozzles 2a, to 2d,, respectively. FIG. 4 is an explanatory diagram showing the configuration of a nozzle 2. The core liquid distributing tubes 23a, to 23d, are each connected directly to a nozzle tip 26, which is disposed at the tip of the nozzle 2. Incidentally, the nozzles 2a, to 2d are all the same in structure. The nozzle 2 is so formed as to include a core liquid nozzle base 27, a coating liquid nozzle base 28, and a fixture 29. As shown in FIG. 4, the core liquid distributing tubes 23a, to 23d,, which are each connected to the nozzle tip 26, are each drawn out of an upper end of the nozzle 2 through the core liquid nozzle base 27.

In the coating liquid nozzle base 28, a coating liquid inflow opening 28a, is provided. To the coating liquid inflow opening 28a,, the coating liquid distributing tubes 25a, to 25d, are each connected. Similarly in this case, the coating liquid distributing tubes 25a, are each set so as to be the same in length. To a lower side of the coating liquid nozzle base 28, the fixture 29 is attached. To a lower end portion of the coating liquid nozzle base 28, a nozzle cap 30 is attached so as to cover the nozzle tip 26. At a tip portion of the nozzle cap 30, a coating liquid discharge opening 30a, is formed on the outer circumference of the nozzle tip 26.

In the nozzle 2, the core liquid 5 is released from the tip of the nozzle tip 26. From the coating liquid discharge opening 30a,, the coating liquid 6 is discharged so as to surround the periphery of the core liquid 5. The two-layer liquid discharged from the nozzle 2 is appropriately divided into droplets 4 because of vibrations being applied to the core liquid 5 before flowing into the capsule forming pipe 3. Incidentally, for the core liquid distributing tubes 23a, to 23d,, synthetic resin and other materials with low heat conductivity are used. Therefore, in the nozzle 2, the core liquid 5 has less chance of being affected by high temperatures from the coating liquid 6. As a result, the advantage is that bifid bacteria and other heat-sensitive substances are turned into capsules.

The air vent device 35 is placed on a head-top portion of the distributor 21. At a tip portion of the air vent device 35, an air discharge opening 40 is provided. As shown in FIG. 2, the tip portion of the air vent device 35 is in the shape of L. The air discharge opening 40 opens in a lateral direction. When air is removed in the distributor 21, an air-removing operation takes place until the core liquid 5 starts to spill over. Therefore, in the distributor 21, the tip portion of the device is in the shape of L so that it becomes easier to recover the spilled core liquid 5; at a tip of an extending portion 41 extending in the horizontal direction, the air discharge opening 40 opens. Moreover, the air discharge opening 40 communicates with a flow passage 43, which is formed inside a main unit 42 of the air vent device. In the flow passage 43, an on-off valve 44 is provided to control a flow in the flow passage 43. A cock 45 of the on-off valve 44 is provided midway of the device main unit 42. When the on-off valve 44 is opened by the cock 45, the air-removing hole 37 then communicates with the air discharge opening 40.

The tube part 32 is in the shape of a cylinder, with openings at both ends. An upper end side of the tube part 32 is connected to the upper flange 34 through a gasket 46. On a side portion of the tube part 32, a core liquid supply hole 47 is so formed as to pierce therethrough. The core liquid supply hole 47 is a female screw hole to which a tube attachment portion 48 having a male screw portion is attached. On the tube attachment portion 48, a core liquid supply opening 48a is so formed as to open. To the core liquid supply opening 48a, a core liquid supply tube 49 is connected. As a result, the distributor 21 is connected to the core liquid tank 15 via the pump 16. Incidentally, the inside diameter of the core liquid supply tube 49 is different from that of the core liquid distributing tubes 23a, to 23d. The diameter of the core liquid distributing tubes 23a, to 23d, is smaller than that of the core liquid supply tube 49. There is a space inside the tube part 32. The space serves as a liquid pool portion 50, in which the core liquid 5 supplied through the core liquid supply tube 49 is stored.

The lower part 33 includes a flat base plate 51; a vibratory film (membrane) 52, which is attached to a lower-surface side of the base plate 51; and a presser plate 53, which holds the vibratory film 52 between the base plate 51 and the presser plate 53. On the base plate 51, for the bolt holes 38 of the upper flange 34, a plurality of tap holes 54 (eight in this case) is formed so as to be spaced out evenly and pierce therethrough. To the tap holes 54, threaded bolts 55 (four in this case) are attached through the bolt holes 38. The base plate 51 is connected to a lower-end side of the tube part 32 via a gasket 56. As the threaded bolts 55 are fastened, the tube part 32 is fixed between the upper flange 34 and the base plate 51 in an airtight state.

To the lower-surface side of the base plate 51, the vibratory film 52 made of silicon is attached. The vibratory film 52 is held between the base plate 51 and the presser plate 53. On the presser plate 53, a plurality of fixing bolt holes 57 (four in this case) are formed so as to be spaced out evenly and pierce therethrough. Into the bolt holes 57, membrane fixing bolts 58 are inserted from the lower-surface side. With the vibratory film 52 being sandwiched between the base plate 51 and the presser plate 53, the fixing bolts 58 are screwed into the tap holes 54 through the bolt holes 57. As a result, the vibratory film 52 is fixed to the lower-surface side of the base plate 51.

To a central portion of the vibratory film 52, a pin 59 for transmitting vibrations is attached. On the pin 59, a flange portion 61 is formed integrally. On a tip portion of the pin 59, a female screw portion 62 is formed. On the center of the vibratory film 52, a pin hole 63 is formed. On an upper-surface side of the vibratory film 52, a set plate 64 is placed in line with the pin hole 63. On the set plate 64, a male screw portion 65 is formed. The male screw portion 65 is inserted into the pin hole 63 from the upper-surface side of the vibratory film 52 and is screwed into the female screw portion 62 of the pin 59. As a result, the pin 59 is fixed to the central portion of the vibratory film 52.

The pin 59 is connected to the vibrator 24, which is placed below the distributor 21. The vibrator 24 is attached to a vibrator attachment base 66. The pin 59 is connected and fixed to a pin fixing portion 67 placed on an upper-end center of the vibrator 24. Above the vibrator attachment base 66, a distributor attachment base 68 is provided. To the attachment base 68, supporting bolts 71 are attached to support and fix the distributor 21. On the other hand, attachment holes 72 are formed at four corners of the base plate 51. On the supporting bolts 71, supporting nuts 73 are attached. As the supporting bolts 71 are inserted into the attachment holes 72, the base plate 51 is kept by the supporting nuts 73. Furthermore, to the supporting bolts 71 that project from the base plate 51, base plate fixing nuts 74 are also attached. As a result, the distributor 21 is placed and fixed on the distributor attachment base 68.

Figure 5:
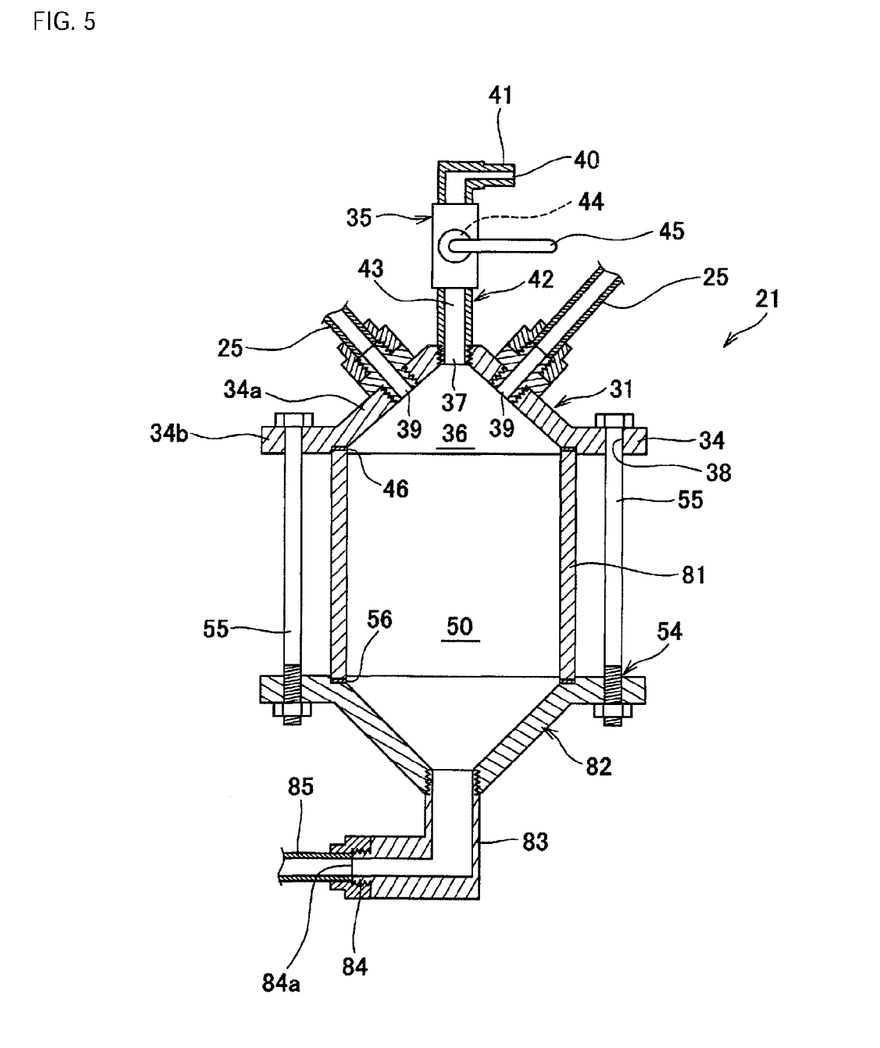
FIG. 5 is a cross-sectional view showing the configuration of a coating liquid distributor.

The coating liquid distributor 22 is formed substantially in the same way as the distributor 21. FIG. 5 is a cross-sectional view showing the configuration of the coating liquid distributor 22. Incidentally, the same components and parts as those of the distributor 21 are represented by the same reference symbols and will not be described. As shown in FIG. 5, there is no vibrator 24 attached to the distributor 21. Moreover, on a tube part 81, there is no coating liquid supply hole provided. Furthermore, a lower part 82 is formed in the same way as the upper part 31. However, no air vent device 35 is attached to the lower part 82. Instead, a coating liquid supply portion 83 is attached.

On the coating liquid supply portion 83, a tube attachment portion 84 is formed and disposed so as to project in a lateral direction. On a tip portion of the tube attachment portion 84, a coating liquid supply opening 84a, is so formed as to open. To the coating liquid supply opening 84a, a coating liquid supply tube 85 is connected. As a result, the distributor 22 is connected to the coating liquid tank 17 via the pump 18. Incidentally, even in this case, the coating liquid distributing tubes 25a, to 25d, are smaller in diameter than the coating liquid supply tube 85. There is a space inside the tube part 81. The space serves as a liquid pool portion 50, in which the coating liquid 6 supplied through the coating liquid supply tube 85 is stored.

According to the manufacturing apparatus 1 as described above, seamless capsules are produced in the following manner. First, the pumps 16 and 18 start to operate, and the core liquid 5 is supplied from the core liquid tank 15 to the distributor 21, while the coating liquid 6 is supplied from the coating liquid tank 17 to the distributor 22. In the distributor 21, the core liquid 5 is supplied to the tube part 32 via the core liquid supply tube 49. Moreover, in the distributor 22, the coating liquid 6 is supplied to the lower part 82 via the coating liquid supply tube 85. After being supplied to the distributors 21 and 22, the core liquid 5 and the coating liquid 6 flow into the liquid pool portions 50 of the tube parts 32 and 81, respectively. As the liquid pool portions 50 are filled with the liquids and the liquid levels go up and reach the cavity portions 36 inside the upper flanges 34, the liquids each start to spill out of the tube holes 39a, to 39d. The liquids that have spilled from the tube holes 39a, to 39d, are each supplied to the nozzles 2a, to 2d through the distributing tubes 23a, to 23d, and 25a, and 25d.

In that manner, according to the manufacturing apparatus 1 of the present invention, the distributors 21 and 22 exist between the pumps 16 and 18 and the nozzles 2. The core liquid 5 and the coating liquid 6 flow through the distributors 21 and 22 before being supplied to each of the nozzles 2a, to 2d. In this case, in the distributors 21 and 22, the liquid pool portions 50 are provided. The core liquid 5 and the coating liquid 6 are stored in the liquid pool portions 50 before being supplied to each of the nozzles 2a, to 2d. Moreover, in the distributors 21 and 22, the tube holes 39a, to 39d, for supplying liquids are disposed on the upper flange 34 so as to be evenly spaced. Therefore, the core liquid 5 and the coating liquid 6 that are supplied to each of the nozzles 2a, to 2d, are substantially the same in flow velocity and flow volume; the differences in flow volume between the nozzles become small. Moreover, the distributing tubes 23a, to 23d, and 25a, to 25d, are set so as to be the same in length. Therefore, the delivery resistance of the tube holes 39a, to 39d,, as well as pressure losses through the nozzles 2, becomes equalized. Therefore, it is possible to further reduce the differences in flow volume between the nozzles.

After being supplied to the nozzles 2a, to 2d,, the core liquid 5 and the coating liquid 6 are released from the nozzle tip portions, and droplets 4 are formed. At this time, the core liquid 5 is vibrated by the vibrator 24. Because of the vibrations, the two-layer liquid released from the nozzle 2 is divided into droplets 4. Thus, according to the manufacturing apparatus 1 of the present invention, like the one disclosed in Patent Document 1,, a conventional vibrator attached to a multi-nozzle is unnecessary. Therefore, it is not necessary to provide a vibrator for each nozzle even in the manufacturing apparatus equipped with a plurality of nozzles, and it is possible to make the configuration of the device simple and reduce costs of the device.

Moreover, as described above, in the device disclosed in Patent Document 1,, there is a liquid pool below a flexible vibratory film. Since the liquid slows down in the above portion, air accumulates in the liquid pool, which causes the particle diameter to vary. In the case of the manufacturing apparatus 1, most of the air is removed by an air-removing operation of the distributors 21 and 22. However, the above air-removing operation is not a perfect solution. If a multi-nozzle having the same structure as the conventional one is used, air accumulates in the nozzle, causing the particle diameter to vary. According to the manufacturing apparatus 1 of the present invention, there is no need to provide a vibrator for each nozzle; the core liquid distributing tubes 23a, to 23d, can be connected directly to the nozzle tips 26. Therefore, a portion where the liquid slows down disappears in the nozzle; unlike the conventional one, air does not accumulate in the nozzle, making it possible to reduce variations in the particle diameter.

Furthermore, unlike the device disclosed in Patent Document 2,, which depends only on pumps to control the particle diameter, the manufacturing apparatus 1 of the present invention can vibrate the core liquid 5 of the nozzles 2a, to 2d, in a stable manner and at the same rate with the use of the vibrator 24. Therefore, it is possible to keep the differences in the particle diameter between the nozzles low. Incidentally, it is desirable that the vibrator 24 vibrates the core liquid 5 through the flexible vibratory film 52 set in the distributor 21, rather than vibrate the distributor 21 directly. The first reason is that the process of vibrating through the flexible vibratory film 52 causes less damage to the distributor 21 than the process of vibrating the distributor directly. The second reason is that the use of the vibratory film 52 enables the strength and frequency of vibrations applied to the core liquid 5 to be controlled as desired, and also enables a wide range of seamless capsules, ranging in particle diameter from large capsules to small, to be produced as desired. Moreover, it is desirable that the tube holes 39a, to 39d, be at the same distance from the vibratory film 52 so that vibrations are transmitted to each of the tube holes 39a, to 39d, at the same rate. The distributor 21 of the manufacturing apparatus 1 is set similarly. In that respect, the distributor 21 is designed to reduce the differences in particle diameter between capsules.

As seamless capsules are produced as described above, air that each liquid contains accumulates in the distributors 21 and 22 over time. As described above, the conventional device, disclosed in Patent Document 2,, cannot run for a long time because there is no mechanism for removing the air. According to the conventional device, an operation of disassembling the device to remove the air is required according to circumstances, resulting in a reduction in productivity. In that respect, in the manufacturing apparatus 1 of the present invention, the air vent devices 35 are provided in the distributors 21 and 22. Since the air is removed therefrom, it is possible for the device to run for a long time.

The air that the core and coating liquids 5 and 6 contain during the capsule production process is lighter than the liquids. Therefore, the air accumulates in the head-top portions of the distributors 21 and 22, i.e. in the cavity portions 36 inside the upper flanges 34. Therefore, after air has accumulated to a certain degree and the air layer has reached the tube holes 39a, to 39d,, the cock 45 of the air vent device 35 is operated. Then, the air-removing hole 37 communicates with the air discharge opening 40, releasing the air inside the cavity portion 36. The air-removing operation takes place at a time when the pumps 16 and 18 are operating, and goes on until the core liquid 5 or coating liquid 6 seeps out of the air discharge opening 40. As a result, the air is driven out of the cavity portion 36, and it is possible to carry out the device's air-removing process without suspending production for a long time. Thus, it is possible to improve productivity. Incidentally, for the on-off valve 44, an electromagnetic valve may be used and programmed in such a way that the air-removing process regularly takes place for a predetermined period of time.

In that manner, according to the manufacturing apparatus 1 of the present invention, the distributors 21 and 22 exist between the pumps 16 and 18 and the nozzles 2, enabling the core liquid 5 or coating liquid 6 to be evenly supplied to a plurality of nozzles from one pump. Moreover, the vibrator 24 is placed in the distributor 21, making it possible to vibrate the core liquid 5 in an integrated fashion. Therefore, it is possible to reduce the number of pumps or vibrators and reduce costs of the device. Additionally, the core liquid 5 and the coating liquid 6 supplied to each of the nozzles 2a, to 2d, can be substantially the same in flow velocity and flow volume. Thus, the differences in flow volume between the nozzles become small, and it is possible to reduce variations in capsule particle diameter between the nozzles.

Moreover, in the manufacturing apparatus 1, the distributing tubes 23a, to 23d, and 25a, to 25d, are made so as to be the same in length, enabling the liquids to be supplied to each of the nozzles 2a, to 2d, in equal volumes. Thus, it is possible to further reduce the differences in flow volume between the nozzles as well as variations in particle diameter between the nozzles. Moreover, since the core liquid distributing tubes 23a, to 23d, are connected directly to the nozzle tips 26, a core liquid supply system does not change in diameter, and a portion where liquids slow down disappears. Therefore, it is possible to prevent uneven vibrations caused by the accumulation of air bubbles, as well as to reduce variations in capsule particle diameter between the nozzles. Thus, according to the manufacturing apparatus 1 of the present invention, with the use of one device, it is possible to produce seamless capsules of equal particle diameter in large numbers in an efficient manner.

Furthermore, the air vent devices 35 are provided in the distributors 21 and 22. Therefore, without performing a process of disassembling the device, a process of upending the nozzles and other processes, it is possible to easily remove air from a plurality of nozzles at once. Thus, it is possible to perform the air-removing process without suspending the device for a long time and improve productivity.

EXAMPLE 2

The following describes a seamless capsule manufacturing apparatus according to example 2, of the present invention. In the above-described example, the structure designed to prevent the accumulation of air in the distributors as much as possible is employed in order to reduce variations in particle diameter between the nozzles. In example 2,, thanks to a different way of thinking, an air pool is created so as to reduce pulsation of pumps. It is difficult to apply such a kind of structure to the core liquid distributor in which the vibrator is set. However, it is possible to apply the structure to the coating liquid distributor, which will be described in example 2.

Figure 6:
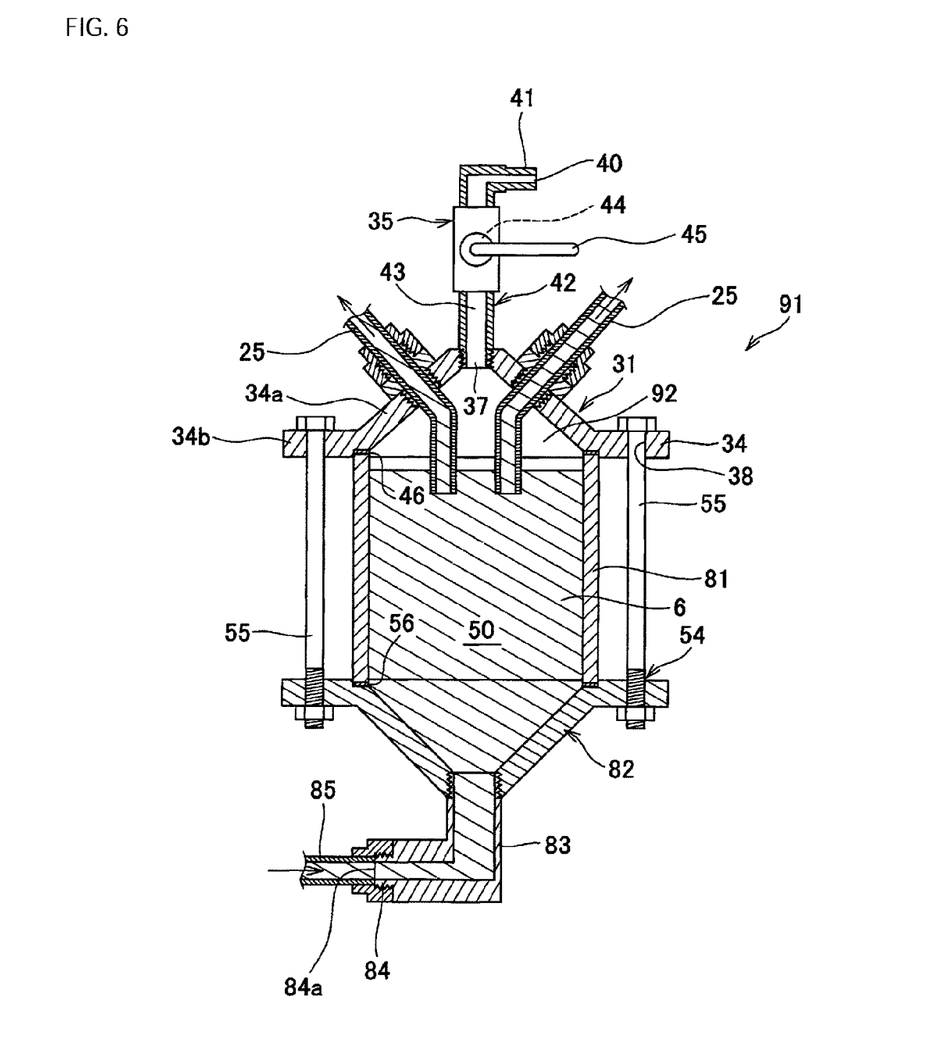
FIG. 6 is an explanatory diagram showing the configuration of a coating liquid distributor, which is used in a seamless capsule manufacturing apparatus in example 2, of the present invention.

FIG. 6 is an explanatory diagram showing the configuration of a coating liquid distributor 91, which is used in a seamless capsule manufacturing apparatus in example 2, of the present invention. Incidentally, in the example and alternative examples described below, the same members or parts as those in example 1, are represented by the same reference symbols and will not be described. As shown in FIG. 6, in the coating liquid distributor 91, an air pool 92 is formed above the liquid pool portion 50. In the distributor 91, the distributing tubes 25 are inserted into the distributor, extending to the liquid pool portion 50. Tip portions of the distributing tubes 25 are submerged in the coating liquid 6. Even in the distributor 91, the coating liquid 6 is supplied from the coating liquid supply portion 83 and stored in the liquid pool portion 50. The coating liquid 6 in the liquid pool portion 50 is directly supplied to the distributing tubes 25, which are submerged in the coating liquid 6, before being supplied to the nozzles 2a, to 2d.

In this case, the coating liquid 6 is supplied by the pump 18 to the distributor 91. However, pulsation of the coating liquid 6 could occur as the liquid is supplied by the pump; the capsule particle diameter may vary due to the pulsation. In contrast, in the distributor 91, the air pool 92 is provided above the liquid pool portion 50. The air pool 92 absorbs the pulsation of the coating liquid 6, preventing the capsule particle diameter from varying. In general, gas is compressed more easily than liquid. Accordingly, when the pulsation of the coating liquid 6 of the liquid pool portion 50 occurs, the pulsation is transmitted to the air pool 92 above, compressing the air in the air pool. That is, the distributor 91 functions as an accumulator or the like, and the pulsation of the coating liquid 6 is appropriately absorbed in the air pool 92. Therefore, the pressure of the coating liquid 6 supplied from the distributing tubes 25 to the nozzles 2 becomes stable, making it possible to reduce variations in capsule particle diameter.

The present invention is not limited to the above-described examples, and, needless to say, may be modified in various ways without departing from the scope thereof.

For example, in the above-described examples, the convex portions 34a, of the upper portions of the distributors 21 and 22 are tapered. However, the shape of the convex portions is not limited to the above; the convex portions, for example, can be formed in the shape of a dome. Moreover, in the above-described examples, what is described is the seamless capsule manufacturing apparatus that uses the flow of the two-layer liquid. However, the present invention can also be applied to a device that manufactures seamless capsules having three or more layers.

Figure 7:
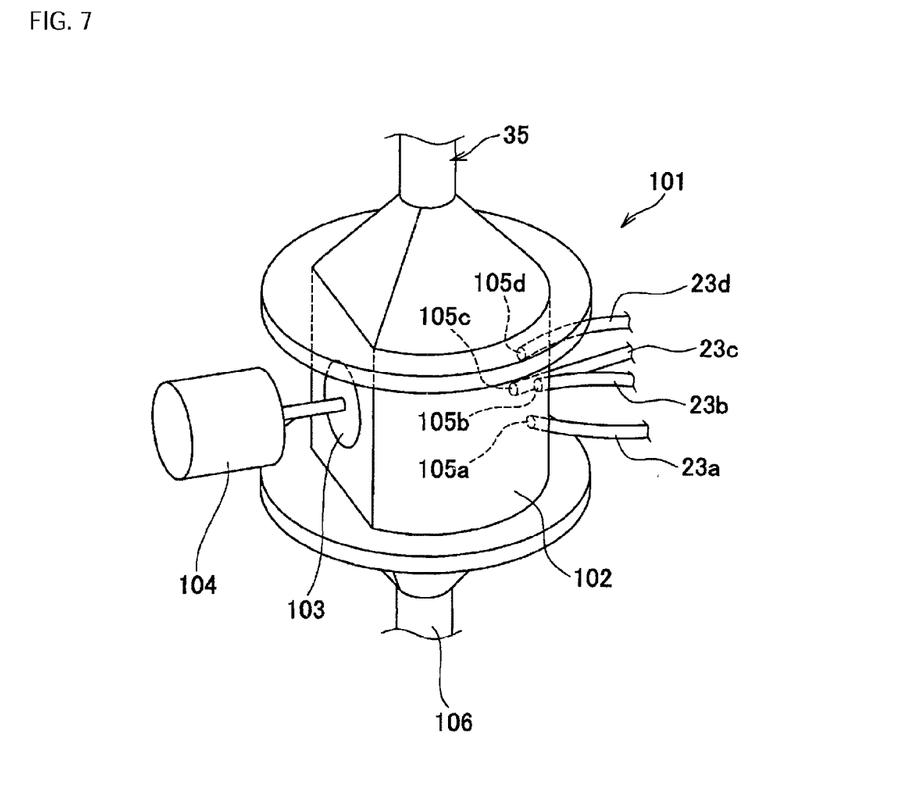
FIG. 7 is an explanatory diagram showing the configuration of an alternative example of a core liquid distributor.

Moreover, in the above-described examples, what is described is the structure in which the vibrator 24 of the core liquid distributor 21 and the tube holes 39a, to 39d, are arranged in the vertical direction of the device. However, the locations where the above components are placed are not limited to the above structure. For example, the vibrator 24 and the tube holes 39a, to 39d, may be placed on a side of the tube part 32 so as to extend in the horizontal direction. FIG. 7 is an explanatory diagram showing the configuration of such an alternative example. In a core liquid distributor 101 shown in FIG. 7, a vibratory film 103 is placed on a side of a tube part 102. To the vibratory film 103, a vibrator 104 is connected. On the side of the tube part 102, tube holes 105a to 105d, are provided at locations that face the vibratory film 103. Core liquid distributing tubes 23a, to 23d, are connected to the tube holes 105a, to 105d,, respectively. On a lower side of the tube part 32, a coating liquid supply portion 106 is provided in the same way as the distributor 22.

In the above distributor 101, as the vibratory film 103 vibrates, the vibrations are transmitted to the tube holes 105a, to 105d,; at the core liquid distributing tubes 23a, to 23d, the vibrations are applied to the core liquid 5, which is supplied to the nozzle 2. As described above, when the tube holes 105a, to 105d, are provided on the side of the tube part 102, the liquid accumulates easily in an area higher than the tube holes 105a, to 105d. However, unlike the coating liquid 6, gelatin, which is weak in high-temperature accumulation, is rarely used for the core liquid 5. Therefore, the use of such a structure does not cause any problems. However, when a material that should not be accumulated is used for the core liquid 5, the distributor 21 shown in FIG. 2 or 3 is preferred.

The invention claimed is:

1. A seamless capsule manufacturing apparatus comprising:
    a capsule forming pipe for holding a hardening liquid;
    a plurality of nozzles configured to release droplets of capsule forming liquid into the capsule forming pipe to form seamless capsules;
    a plurality of tubes having a same length connected to the nozzles, respectively; and
    a distributor connected to the tubes and configured to distribute the capsule forming liquid to the nozzles through the tubes,
    wherein the distributor includes:
        a liquid pool portion for storing the capsule forming liquid;
        a cavity portion disposed above the liquid pool portion and configured to accumulate air contained in the capsule forming liquid;
        an air vent device connected to the cavity portion and configured to release accumulated air out of the distributor;
        a vibrator that vibrates the capsule forming liquid;
        a flexible vibratory film attached to the distributor, wherein the vibrator is connected to the distributor via the flexible vibratory film; and
        a plurality of tube holes to which the tubes are connected, wherein the flexible vibratory film is disposed at a same distance from each of the tube holes.

2. The seamless capsule manufacturing apparatus of claim 1, wherein the air vent device is disposed on a head-top portion of the distributor.

3. The seamless capsule manufacturing apparatus of claim 1, further comprising a pump for supplying the capsule forming liquid to the distributor,
    wherein the cavity functions as an air pool to absorb the pulsation of the pump.

4. The seamless capsule manufacturing apparatus of claim 3, wherein the tubes are inserted into the distributor, and
    wherein the tubes extend such that tip portions of the tubes will be submerged in the capsule forming liquid stored in the liquid pool portion.

5. The seamless capsule manufacturing apparatus of claim 1, wherein the nozzles include nozzle tips which discharge the capsule forming liquid into the capsule forming pipe, and
    wherein the tubes are connected directly to the nozzle tips.

6. The seamless capsule manufacturing apparatus of claim 1, further comprising a pump and a liquid supply tube connecting the pump to the distributor for supplying the capsule forming liquid to the distributor,
    wherein the distributor further includes:
        an upper part that is connected to the tubes for supplying the capsule forming liquid to each of the nozzles, the upper part having the cavity portion and the air vent device; and
        a tube part that is connected to the liquid supply tube.

7. The seamless capsule manufacturing apparatus of claim 6, wherein the distributor further includes a lower part having the vibrator configured to vibrate the capsule forming liquid.

8. A seamless capsule manufacturing apparatus comprising:
    a capsule forming pipe for holding a hardening liquid;
    a plurality of nozzles configured to release droplets of capsule forming liquid into the capsule forming pipe to form seamless capsules;
    a plurality of tubes having a same length connected to the nozzles, respectively;
    a distributor connected to the tubes and configured to distribute the capsule forming liquid to the nozzles through the tubes; and
    a pump and a liquid supply tube connecting the pump to the distributor for supplying the capsule forming liquid to the distributor;
    wherein the distributor includes:
        a liquid pool portion for storing the capsule forming liquid;
        a cavity portion disposed above the liquid pool portion and configured to accumulate air contained in the capsule forming liquid; and
        an air vent device connected to the cavity portion and configured to release accumulated air out of the distributor;

an upper part that is connected to the tubes for supplying the capsule forming liquid to each of the nozzles, the upper part having the cavity portion and the air vent device; and a tube part that is connected to the liquid supply tube.

9. The seamless capsule manufacturing apparatus of claim 8, wherein the air vent device is disposed on a head-top portion of the distributor.

10. The seamless capsule manufacturing apparatus of claim 9, wherein the distributor includes a plurality of tube holes to which the tubes are connected, and wherein the tube holes are each disposed at a same distance from an air-removing hole to which the air vent device is attached.

11. The seamless capsule manufacturing apparatus of claim 8, further comprising a pump for supplying the capsule forming liquid to the distributor, wherein the cavity functions as an air pool to absorb the pulsation of the pump.

12. The seamless capsule manufacturing apparatus of claim 11, wherein the tubes are inserted into the distributor, and wherein the tubes extend such that tip portions of the tubes will be submerged in the capsule forming liquid stored in the liquid pool portion.

13. The seamless capsule manufacturing apparatus of claim 8, wherein the distributor further includes a vibrator that vibrates the capsule forming liquid.

14. The seamless capsule manufacturing apparatus of claim 13, further comprising a flexible vibratory film attached to the distributor, wherein the vibrator is connected to the distributor via the flexible vibratory film.

15. The seamless capsule manufacturing apparatus of claim 14, wherein the distributor includes a plurality of tube holes to which the tubes are connected, and wherein the flexible vibratory film is disposed at a same distance from each of the tube holes.

16. The seamless capsule manufacturing apparatus of claim 8, wherein the nozzles include nozzle tips which discharge the capsule forming liquid into the capsule forming pipe, and wherein the tubes are connected directly to the nozzle tips.

17. The seamless capsule manufacturing apparatus of claim 8, wherein the distributor further includes a lower part having a vibrator configured to vibrate the capsule forming liquid.

* * * * *